(No Model.)

J. F. SMITH.
Nut Lock.

No. 239,566. Patented March 29, 1881.

WITNESSES:
A B Robertson
Solon C. Kemon

INVENTOR:
Jno. F. Smith
BY
ATTORNEYS.

UNITED STATES PATENT OFFICE.

JOHN F. SMITH, OF ERIE, PENNSYLVANIA, ASSIGNOR OF ONE-HALF TO JOHN S. CARTER, OF SAME PLACE.

NUT-LOCK.

SPECIFICATION forming part of Letters Patent No. 239,566, dated March 29, 1881.

Application filed October 15, 1880. (No model.)

*To all whom it may concern:*

Be it known that I, JOHN FRANKLIN SMITH, of Erie, in the county of Erie and State of Pennsylvania, have invented a new and Improved Nut-Lock; and I do hereby declare that the following is a full, clear, and exact description of the same.

My improved nut-lock is particularly adapted to bolts for connecting the ends of railroad-rails, but may be applied to bolts and nuts generally; and the invention belongs to that class of nut-locks wherein a ratchet-block or spring-stop is employed between the inner face of the nut and its contact-surface and engages with grooves upon the said inner face of the nut to admit of the free movement of the nut in one direction and prevent it from moving in the other direction, and being thereby unscrewed from the end of the bolt by the constant vibration of the bolt and nut.

I provide a fish-plate or bearing-plate with a recess in its face to receive a rubber-block and ratchet block or pawl for engaging the nut applied to the bolt that secures the plate in place, and I locate the recess at such distance from the hole through which passes the bolt for securing the fish-plate that said pawl is accessible to, and may hence be pressed in by a suitable instrument or hand-tool to take it out of engagement with the nut of the bolt, and thus allow the nut to be readily turned off the bolt when it is desirable or necessary for any purpose, as, for example, for substituting a new rail for one that is worn out.

Figure 1:
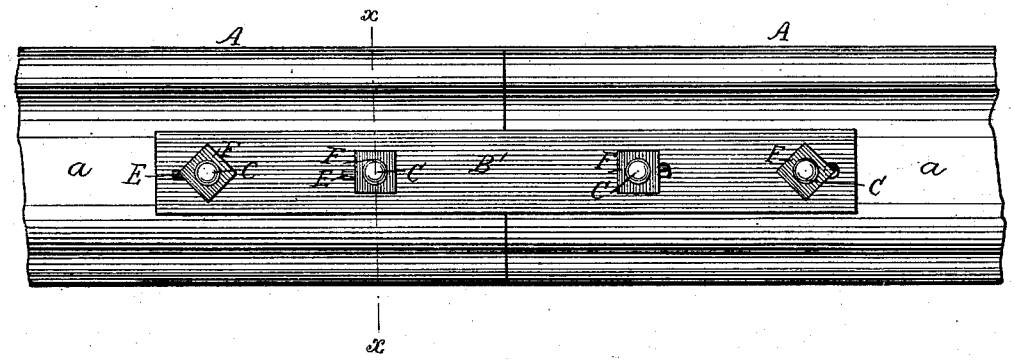
Figure 2:
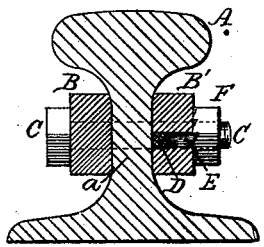
Figure 3:
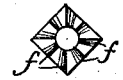
Figure 4:
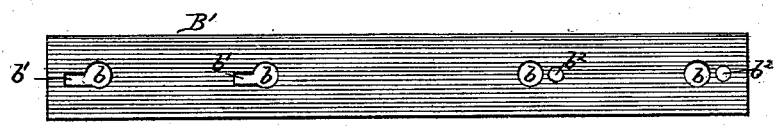

In the accompanying drawings, Figure 1 is a side elevation of a rail-joint; Fig. 2, a vertical section in the line $x$ $x$ with the nut in place; Fig. 3, a face view of the nut, and Fig. 4 a side elevation of a fish-plate detached.

The rails A A are herein shown as joined together in the usual manner, with fish-plates B B' upon opposite sides of their webs $a$ $a$, and bolts C C, that pass through the fish-plates and rail-web. The head fish-plate B is simply perforated to receive the bolts in the usual way, and the nut fish-plate B' is similarly perforated or punched out at $b$, and is also formed with a slotted opening or perforation, $b'$, contiguous to the bolt-hole $b$, into which opening are placed a rubber-block, D, and a ratchet-block, E, to rest upon the block D, and have its outer edge project a short distance from the plate, so that when sufficient pressure is brought upon it the block E will be forced down into the slot until its edge is flush with the surface of the plate.

The nut F is formed with radial ratchet-shaped grooves $f$, into which the block E engages, so that when the nut is screwed closely down against the fish-plate the ratchet-block will prevent the nut from turning in either direction by the usual slight pressure caused by jar or concussion, but will yield when sufficient force is applied to the nut with a wrench or other suitable appliance.

The drawings show the block E formed with a beveled edge, the flat portion of which is placed uppermost to offer a dead-lock to the nut when strains come upon it to unscrew it, and the beveled portion of which will offer but little resistance to the turning of the nut in the opposite direction to screw it down against the fish-plate. When this form is used the bolt can be removed by applying a wrench to the head of the bolt upon the opposite side of the rail, or by forcing the block E down below the surface of the fish-plate with a hand-tool.

The drawings also show the blocks E arranged radially to the center of the bolt, and show the slots or openings $b'$ as communicating with, and forming part of, the bolt-hole $b$. The holes $b$ $b'$ may both be punched out of the plate at once, or the bolt-hole may be punched first and the opening or slot $b$ punched afterward.

Instead of a slotted opening that communicates with the bolt-hole, a separate and smaller hole, $b^2$, may be punched through the fish-plate sufficiently near the bolt-hole $b$ to come beneath the face of the nut to receive a ratchet-block, and yet in such local relation to the edge of the nut as to render a portion of it visible and accessible, so that the block or pawl may be pressed in by a hand-tool.

I am aware that nuts have been provided with notches in their face to engage with a ratchet or spring-catch and do not broadly claim such construction.

I claim as new—

The combination of the fish-plate having a recess in its face, the screw-bolt, and nut having ratchet-grooves in its under side, and a rubber block and ratchet-block placed in said recess, which is located at such distance from the bolt-hole that the nut projects over a portion of the ratchet-block, and thus confines it in place yet leaves another portion thereof exposed, so that it is accessible, as and for the purpose specified.

JOHN FRANKLIN SMITH.

Witnesses:
PETER SCHNELL,
SAM. WOODS.